United States Patent
Noguchi et al.

(10) Patent No.: US 10,975,282 B2
(45) Date of Patent: Apr. 13, 2021

(54) PARTICULATE MATERIAL AND THERMAL CONDUCTIVE SUBSTANCE

(71) Applicant: ADMATECHS CO., LTD., Miyoshi (JP)

(72) Inventors: Shingi Noguchi, Miyoshi (JP); Masaru Kuraki, Miyoshi (JP); Tempo Nakamura, Miyoshi (JP)

(73) Assignee: ADMATECHS CO., LTD., Miyoshi (JP)

( * ) Notice: Subject to any disclaimer, the term of this patent is extended or adjusted under 35 U.S.C. 154(b) by 0 days.

(21) Appl. No.: 16/777,096

(22) Filed: Jan. 30, 2020

(65) Prior Publication Data

US 2020/0263071 A1 Aug. 20, 2020

Related U.S. Application Data

(63) Continuation of application No. PCT/JP2019/005860, filed on Feb. 18, 2019.

(51) Int. Cl.
| | |
|---|---|
| *C09K 5/14* | (2006.01) |
| *C01F 7/02* | (2006.01) |
| *C08K 3/22* | (2006.01) |
| *C08K 7/18* | (2006.01) |

(52) U.S. Cl.
CPC .............. *C09K 5/14* (2013.01); *C01F 7/02* (2013.01); *C08K 3/22* (2013.01); *C08K 7/18* (2013.01); *C01P 2004/32* (2013.01); *C01P 2004/61* (2013.01); *C01P 2006/22* (2013.01); *C01P 2006/32* (2013.01); *C08K 2003/2227* (2013.01); *C08K 2201/001* (2013.01); *C08K 2201/005* (2013.01)

(58) Field of Classification Search
CPC ..... C09K 5/14; C01F 7/02; C08K 3/22; C01P 2004/32; C01P 2006/32
See application file for complete search history.

(56) References Cited

U.S. PATENT DOCUMENTS

| | | | |
|---|---|---|---|
| 8,354,091 B2 | 1/2013 | Kunitomo et al. | |
| 2010/0051855 A1* | 3/2010 | Kunitomo | C01F 7/027 252/75 |

(Continued)

FOREIGN PATENT DOCUMENTS

| | | |
|---|---|---|
| CN | 107555455 A | 1/2018 |
| JP | 8-295971 A | 11/1996 |

(Continued)

OTHER PUBLICATIONS

International Search Report dated Apr. 9, 2019, in PCT/JP2019/005860, filed Feb. 18, 2019 (with English Translation) (5 pages).

(Continued)

*Primary Examiner* — Necholus Ogden, Jr.

(74) *Attorney, Agent, or Firm* — Oblon, McClelland, Maier & Neustadt, L.L.P.

(57) ABSTRACT

A particulate material is mainly composed of alumina, has a volume average particle diameter of from 70 to 200 μm, has a degree of sphericity of from 0.89 or more to less than 0.99, has a degree of alfa-aluminization of from 40 to 85%, and produces a result of 0.017 g or less in an abrasion test for equipment.

6 Claims, 1 Drawing Sheet

(56) References Cited

U.S. PATENT DOCUMENTS

| | | | |
|---|---|---|---|
| 2011/0046267 A1* | 2/2011 | Tanaka | C08G 59/621 |
| | | | 523/440 |
| 2016/0369148 A1* | 12/2016 | Nishio | C09C 1/40 |
| 2017/0210886 A1* | 7/2017 | Ikeda | C01F 7/02 |
| 2019/0051906 A1* | 2/2019 | Rhee | H01M 4/623 |
| 2019/0308883 A1* | 10/2019 | Yuan | C08K 3/22 |
| 2019/0359875 A1* | 11/2019 | Nishio | C08K 3/40 |

FOREIGN PATENT DOCUMENTS

| | | | |
|---|---|---|---|
| JP | 2001-266332 A | 9/2001 | |
| JP | 2002-348116 A | 12/2002 | |
| JP | 2011-098841 A | 5/2011 | |
| JP | 2011-102215 A | 5/2011 | |
| JP | 2017-190267 A | 10/2017 | |
| WO | WO-2005066252 A2 * | 7/2005 | H05K 1/0373 |
| WO | WO 2008/053536 A1 | 5/2008 | |
| WO | WO 2009/017170 A1 | 2/2009 | |
| WO | WO 2009/133904 A1 | 11/2009 | |

OTHER PUBLICATIONS

Written Opinion of the International Search Authority (ISR) dated Apr. 9, 2020, in PCT/JP2019/005860) (with English Translation) (5 pages).

Decision to Grant dated Jul. 11, 2019, in Japanese Patent Application No. 2019-531838 (with English Translation) (6 pages).

Opposition to grant of patent (Opponent: Shiina) issued Mar. 10, 2020 in corresponding Patent Application No. 2019-531838 (with English Translation), 21 pages.

Opposition to grant of patent (Opponent: Taniguchi) issued Mar. 10, 2020 in corresponding Patent Application No. 2019-531838 (with English Translation), 22 pages.

"Alumina for Filling", Nippon Light Metal Company, Ltd., Feb. 4, 2020, (with Partial English Translation), 6 pages.

"Aluminium Oxide", Encyclopedic Dictionary of Chemistry, 1989, (p. 865) (with Partial English Translation), 6 pages.

The Intellectual Property High Court Decision of Nov. 4, 2019 (Case No. 2018 (Ke) 10110, 10112, and 10155), (with Partial English Translation), 210 pages.

Opposition to grant of patent (Opponent: Shiina) issued Mar. 10, 2020 in corresponding Patent Application No. 2020-700079 (with English Translation), 21 pages.

Opposition to grant of patent (Opponent: Taniguchi) issued Mar. 10, 2020 in corresponding Patent Application No. 2020-700079 (with English Translation), 22 pages.

Japanese Notice of Reasons for Revocation dated May 28, 2020 in Japanese Patent Application No. 2019-531838 (with unedited computer generated English translation), 31 pages.

Japanese Office Action (Notice of Reasons for Rejecting a Request for Correction) dated Dec. 23, 2020, in Japanese Patent Application No. 2019-531838.

* cited by examiner

PARTICULATE MATERIAL AND THERMAL CONDUCTIVE SUBSTANCE

CROSS REFERENCE TO RELATED APPLICATIONS

The present application is a Continuation Application of International Application No. PCT/JP2019/005860, filed on Feb. 18, 2019, the entire contents of which are incorporated herein by reference.

BACKGROUND OF THE INVENTION

1. Field of the Invention

The present invention relates to a particulate material and a thermal conductive substance.

BACKGROUND ART

2. Description of the Related Art

As the refinement of semiconductor devices develops, the generation of considerable heat has been posing problems. It has been required to transmit the generated heat quickly from semiconductor devices to the outside. Consequently, thermal conductive substances with high thermal conductive property have been desired.

As a conventional thermal conductive substance, a resinous composition, which comprises a particulate material composed of alumina, and the like, dispersed in a resinous material such as a silicone resin, has been used universally (see Japanese Unexamined Patent Publication (KOKAI) Gazette No. 2017-190267, for instance).

Since the higher alumina exhibits a degree of alpha-aluminization the better it is in thermal conductive property, Japanese Unexamined Patent Publication (KOKAI) Gazette No. 2017-190267 discloses to make the degree of alpha-aluminization high as much as possible.

SUMMARY OF THE INVENTION

The present invention has been made in view of the aforementioned circumstances. It is therefore a to-be-achieved assignment to the present invention to provide a particulate material which is of high thermal conductive property, and a thermal conductive substance containing the particulate material.

As a result of investigations that the present inventors carried out earnestly in order to achieve the aforementioned assignment, as a particulate material composed of alumina and to be employed for thermal conductive substance, employing one with a slightly low degree of sphericity proved to increase contact points between particles constituting the particulate material so that high thermal conductive property is exhibited. However, slightly lowering a particulate material in the degree of sphericity generates irregularities in the particulate material in the surface, and poses such a problem that the particulate material and thermal conductive substances containing the particulate material exhibit growing aggressiveness to equipment that deals with them.

The present inventors found out that controlling a degree of alpha-aluminization in alumina, a constituent of particulate material, in a certain range allows providing a particulate material in which thermal conductive property and lowered aggressiveness to equipment are compatible with each other even when the particulate material exhibits a degree of sphericity set to fall in a range producing good thermal conductive property, thereby completing the following subject matters.

(1) A particulate material according to the present invention achieving the aforementioned assignment is mainly composed of alumina, has a volume average particle diameter of from 70 to 200 μm, has a degree of sphericity of from 0.89 or more to less than 0.99, has a degree of alfa-aluminization of from 40 to 85%, and produces a result of 0.017 g or less in an abrasion test for equipment.

Controlling the degrees of alpha-aluminization and sphericity in the above-described ranges not only allows thermal conductive property to upgrade, but also permits aggressiveness to equipment to lower. In particular, the degree of alpha-aluminization falling in the above-described range not only allows the thermal conductive property to be demonstrated sufficiently, but also permits the aggressiveness to be lowered sufficiently.

(2) A thermal conductive substance according to the present invention achieving the aforementioned assignment comprises: the above-described particulate material according to (1); and a resinous material dispersing the particulate material.

The resulting thermal conductive substance is also able to exhibit high thermal conductivity and low aggressiveness to equipment that are compatible with each other, because the contained particulate material exhibits enhanced thermal conductive property and lowered aggressiveness that are compatible with each other.

DESCRIPTION OF THE EMBODIMENTS

Figure 1:
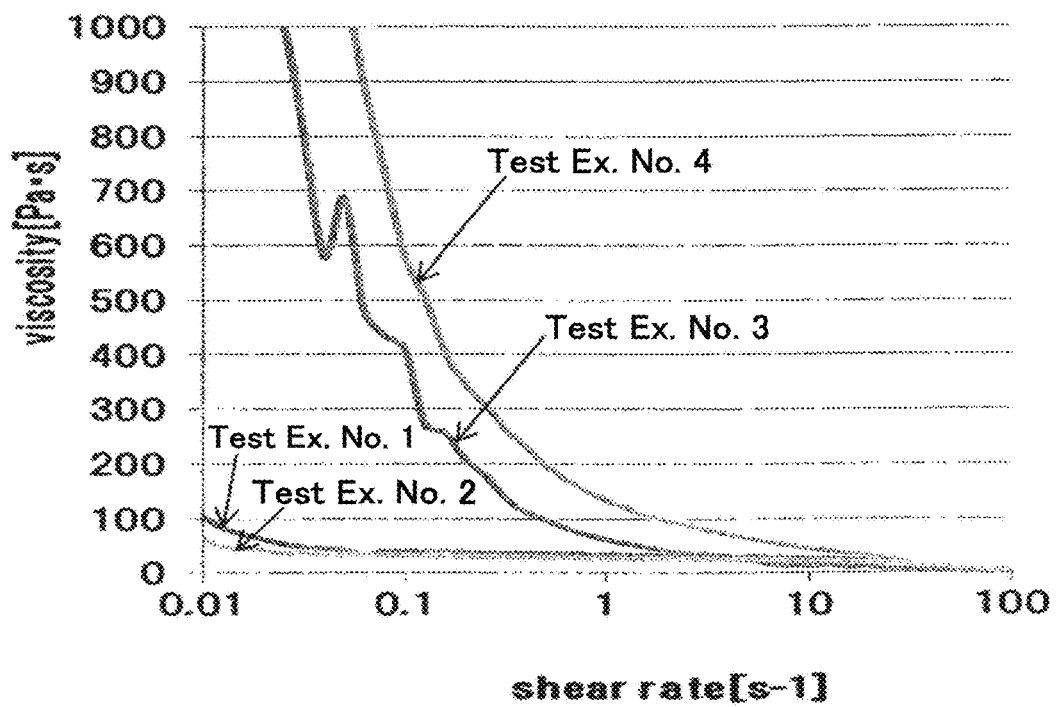
FIG. 1 is a graph showing the dependency of viscosity on shear rate where Test Example Nos. 1 through 4 with 90 μm in volumetric average particle diameter according to examples of the present invention were measured for the viscosity.

A particulate material and thermal conductive substance according to the present invention will be hereinafter described in detail based on an embodiment. A particulate material according to the present embodiment dispersed in a resinous material allows the formation of a thermal conductive substance according to the present embodiment.

1. Particulate Material

A particulate material according to the present embodiment is mainly composed of alumina. The phrase, "mainly composed of alumina," means to contain alumina in an amount of 50% or more based on the entire mass of the present particulate material. Under preferable circumstances, the present particulate material contains alumina in an amount of 60% or more, 80% or more, 90% or more, 95% or more, or 99% or more. The present particulate material is more preferably composed entirely of alumina except for inevitable impurities. A material to be given as another inorganic material, which the present particulate material can further contain other than alumina, involves inorganic materials other than alumina. The inorganic materials other than alumina involve silica, zirconia, titania, and boron nitride. The present particulate material also satisfactorily contains these inorganic materials as a mixture, or even adequately contains one of these inorganic materials in one of its constituent particles.

The alumina exhibits a degree of alpha-aluminization falling in a range of from 40 to 85%. In particular, its employable upper limit value involves 75%, 77%, or 80%; and its employable lower limit value involves 50%, 48%, or 45%. The respective upper limit values and lower limit values are combinable independently of each other. Setting the degree of alpha-aluminization at 85% or less allows lowering aggressiveness to equipment, and setting it at 40% or more permits upgrading thermal conductive property. Note that the degree of alpha-aluminization is a mass proportion of alpha-crystal phase in alumina that is computed based on the entire mass of alumina contained in the present particulate material.

The particulate material according to the present embodiment has a volumetric average particle diameter of from 70 to 200 μm. An employable upper limit value of the volumetric average particle diameter involves 170 μm, 180 μm, or 190 m; and its employable lower limit value involves 100 μm, 90 μm, or 80 μm. The respective upper limit values and lower limit values are combinable independently of each other. Setting the volumetric average particle diameter at 200 μm or less allows thermal conductive substances, which are produced by dispersing the present particulate material in resinous materials, to fill in fine clearances or interspaces; and setting it at 70 μm or more permits reducing the number of contact points between constituent particles of the present particulate material so that thermal conductive property can upgrade.

The particulate material according to the present embodiment has a degree of sphericity of from 0.89 or more to less than 0.99. An employable upper limit value of the degree of sphericity involves 0.96, 0.97, or 0.98; and its employable lower limit value involves 0.92, 0.91, or 0.90. The respective upper limit values and lower limit values are combinable independently of each other. Setting the degree of sphericity at 0.89 or more allows upgrading the present particulate material dispersed in resinous materials in flowability and thermal conductive property; and setting it at less than 0.99 permits upgrading the thermal conductive property.

The degree of sphericity is a value computed from the area and circumferential length of particles observed in a photograph of the present particulate material, which is taken with scanning electron microscope (or SEM), using an equation, (Degree of Sphericity)=$\{4\pi \times (Area) \div (Circumferential Length)^2\}$. The closer the computed value approaches one, the more the particles approximate a true sphere. Specifically, an employed value of the degree of sphericity is an average value that is obtained by measuring 100 particles for the degree of sphericity using image analyzing software (e.g., "A-Zoh Kun" produced by ASAHI-KASEI ENGINEERING Co., Ltd.).

The particulate material according to the present embodiment produces a result of 0.017 g or less in an abrasion test for equipment, preferably 0.015 g or less, more preferably 0.010 g or less.

The "abrasion test for equipment" referred to in the present description comprises the steps of: preparing steel balls (e.g., model number: 1-9762-02, a product of MISUMI) made of a material with "SUS304" quality and with 5 mm in diameter in an amount of 10 g approximately (i.e., from 9.5 g to 10.5 g); preparing the particulate material according to the present embodiment in an amount equal to that of the steel balls (i.e., 10 g approximately); putting the steel balls, and the present particulate material in a 250-mL cylindrical container (e.g., an "I-BOY" jar (a product of AS-ONE) with 62 mm in diameter and 132 mm in length); classifying an alumina powder, namely, the present particulate material, from the steel balls with a sieve with 1 mm in sieve mesh after rotating the cylindrical container around a rotary shaft about the cylindrical central axis at 60 rpm for 56 hours; water washing and then drying the steel balls; and gauging a mass reduction amount of the steel balls for each 10 g before and after the abrasion test.

The particulate material according to the present embodiment satisfactorily undergoes surface treatments. For example, in order to upgrade affinity between the present particulate material and a resinous material that a later-described thermal conductive substance contains, the present particulate material may be treated with a surface treatment agent capable of introducing a functional group that can react with the resinous material, or may also be treated with a surface treatment agent composed of organosilane in order to inhibit the present particulate material from agglomerating. Silane compounds, and silazanes are involved in a surface treatment agent that is usable for the surface treatments and to be given.

2. Production Process for Particulate Material

The particulate material according to the present embodiment is produced by one of the following methods producing alumina particles with a high degree of sphericity: a deflagration method (or VMC method) in which a metallic aluminum powder is cooled rapidly after having been oxidized and combusted in an oxidizing atmosphere; a molten method in which a powder composed of alumina is cooled rapidly after having been heated and melted; and a sol-gel method. Thereafter, converting the metallic structure of the resulting alumina particles into an alpha phase to a required extent allows the production of the present particulate material. The conversion into an alpha phase is permitted by a time for exposing the alumina particles to a high temperature at which alpha-aluminization develops. The time is controlled so as to attain an adequate degree of alpha-aluminization. A trace amount of zinc (e.g., from 1 ppm to 5,000 ppm) is also satisfactorily added to the alumina particles so that heating changes the particulate configuration less. Moreover, the present particulate material can be produced by adjusting the following: the amounts of raw materials, fuels and oxygen supplied in the VMC method and molten method; and the atmospheres within furnaces.

3. Thermal Conductive Substance

A thermal conductive substance according to the present embodiment comprises the above-described particulate material, and a resinous material dispersing the particulate material. A resinous material to be satisfactorily employed involves either of one of thermosetting resins and thermoplastic resins. Moreover, it does not matter that the resinous material is solid or liquid in service. As the resinous material, precursors, such as monomers prior to curing, are also satisfactorily employed. If such is the case, the precursors are able to polymerize in service. A preferable resinous material to be given involves silicone resins (or their precursors), and epoxy resins (or their precursors).

The thermal conductive substance according to the present embodiment desirably comprises the particulate material and resinous material that adhere to each other between them. Moreover, the resinous material, which fills up clearances or interspaces between the particulate materials, allows the present thermal conductive substance to upgrade in thermal conductive property.

Although a mixing ratio between the particulate material and the resinous material is not limited at all especially, the particulate material is preferably mixed in an amount of from 40% by mass to 97% by mass based on a sum of the particulate material and resinous material. In particular, an employable upper limit value involves 95% by mass, or 90% by mass; and an employable lower limit value involves 45% by mass, or 50% by mass. These upper limit value and lower limit values are combinable arbitrarily. The mixing amount of the particulate material set at 40% by mass or more allows the present thermal conductive substance to upgrade in thermal conductive property, and the mixing amount set at 97% by mass or less permits it to upgrade in flowability.

EXAMPLES

A particulate material and thermal conductive substance according to the present invention will be hereinafter described in detail based on examples. Alumina particles whose volumetric average particle diameter was 90 μm were charged into a flame and were thereafter cooled rapidly, thereby producing particulate materials, test samples according to respective test examples that differed in the degrees of alpha-aluminization and sphericity. The degree of alpha-aluminization could be enhanced by decreasing the supply amount of fuel, setting the supply amount of supportive gas at 1.5 times approximately as much as a theoretical air-to-fuel ratio and increasing the charge amount of raw material. The degree of sphericity could be enhanced by increasing the supply amount of fuel, setting the supply amount of supportive gas at a theoretical air-to-fuel ratio and decreasing the charge amount of raw material.

Test No. 1

Measurement of Viscosity and Heat Conductivity

Figure 2:
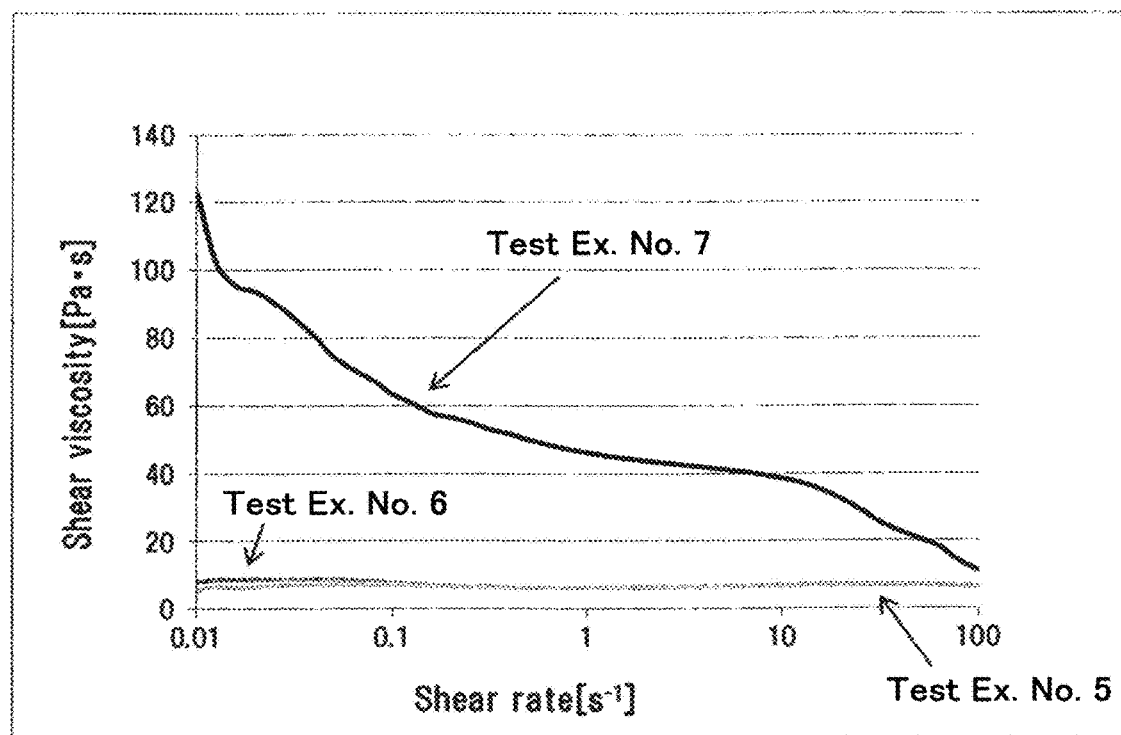
FIG. 2 is a graph showing the dependency of viscosity on shear rate where Test Example Nos. 5 through 7 with 70 μm in volumetric average particle diameter according to examples of the present invention were measured for the viscosity.

The test samples according to the respective test examples whose volumetric average particle diameter was 90 μm were dispersed in a silicone oil (e.g., a silicone resin, KF96-500CS, a product of SHIN-ETSU KAGAKU KOGYO Co., Ltd.) serving as a resinous material so as to account for 80% by mass based on the entire mass, thereby preparing resinous compositions. The resulting resinous compositions were labeled thermal conductive substances according to the respective test samples. Note that the test samples, whose volumetric average particle diameter was 70 μm and which were dispersed in the silicone oil to prepare resinous compositions, accounted for 75% by mass based on the entire mass. Each of the test samples was measured for the viscosity and thermal conductivity. The dependency of viscosity on shear rate was observed by measuring the viscosity with a coaxial cylindrical viscosimeter. FIG. 1 illustrates the results of the measurement for the resinous compositions comprising the particulate materials whose volumetric average particle diameter was 90 μm, and FIG. 2 illustrates the results of the measurement for the resinous compositions comprising the particulate materials whose volumetric average particle diameter was 70 μm. The thermal conductivity was measured by disk heat-flow method. Table 1 shows the values of the thermal conductivity along with the evaluations (◉: very good; ○: good; Δ: satisfactory; and ×:

ordinary (the marks will hereinafter mean the same evaluations)). Note that the resinous members according to Test Example Nos. 3 and 4 tended to separate earlier than did the resinous compositions according to Test Example Nos. 1 and 2, although the resinous members according to Test Example Nos. 3 and 4 kept dispersing uniformly for a certain period of time after they had been mixed.

Test No. 2

Abrasion Test for Equipment

Each of the test samples according to test examples was put in a cylindrical container in an amount of 10 g by mass approximately along with the same mass of steel balls. The steel balls were produced by MISUMI, and had a diameter of 5 mm and a model number: 1-9762-02. The cylindrical container was produced by AS-ONE, and had a diameter of 62 mm and a length of 132 mm. The cylindrical container was rotated around a rotary shaft about the cylindrical central axis at 60 rpm for 56 hours, and thereafter the steel balls were classified from the particulate materials with a sieve with 1 mm in sieve mesh. The steel balls were water washed and dried, and were then gauged for a mass reduction amount for each 10 g before and after the abrasion test. The abrasion test was carried out using the steel balls alone, thereby measuring a relative value of mass increment/decrement amount before and after the abrasion test using the steel balls alone. Table 1 shows the results altogether.

TABLE 1

| | Degree of Alpha-aluminization (%) | Degree of Sphericity | Thermal Conductivity (W/(m·K)) | Viscosity | | Abrasion Test for Equipment (g/10 g) | |
|---|---|---|---|---|---|---|---|
| Test Ex. No. 1 | 76 | 0.99 | 5.55 | Δ | ○ | 0.013 | ◉ |
| Test Ex. No. 2 | 68 | 0.96 | 5.8 | ○ | ○ | 0.015 | ○ |
| Test Ex. No. 3 | 80 | 0.83 | 5.6 | Δ | × | 0.026 | × |
| Test Ex. No. 4 | 93 | 0.80 | 4.8 | × | × | 0.029 | × |

The results shown in Table 1 revealed that a preferable degree of alpha-aluminization is less than 80%. The following are not detailed; however, particulate materials were found to exhibit a sufficient thermal conductivity when the degree of alpha-aluminization is set in a range of from 40% or more to 85% or less. Regardless of the results produced by Test Example No. 3, particulate materials with a degree of alpha-aluminization falling in a range of from 80% or more to 85% or less were also found to give a satisfactory value in the abrasion test for equipment as well when a degree of sphericity is set at 0.89 or more. Note that it was understood from the results of surface observation by an electron microscope that facets appeared in the surface of particulate materials when a degree of alpha-aluminization was set at more than 85% so that they were roughened to exhibit growing aggressiveness to equipment. Moreover, particulate materials whose degree of alpha-aluminization is more than 85% were also found to exhibit growing viscosity characteristics when mixed with resins.

From the results shown in Table 1, a preferable degree of sphericity falls in a range of from more than 0.83 to less than 0.99. However, from the viewpoints of thermal conductivity and viscosity, a necessary degree of sphericity was found to be 0.89 or more.

Summarizing the above therefore made one understand that a preferable degree of alpha-aluminization is from 40% or more to 85% or less and a preferable degree of sphericity is from 0.89 or more to less than 0.99.

Test No. 3

Test examples with degrees of alpha-aluminization and sphericity shown in Table 2 were produced by subjecting the alumina particles whose volumetric average particle diameter was 70 μm to the same heat treatment as that the alumina particles whose volumetric average particle diameter was 90 μm had undergone.

TABLE 2

| | Degree of Alpha-aluminization (%) | Degree of Sphericity | Thermal Conductivity (W/(m · K)) | | Viscosity | | Abrasion Test for Equipment (g/10 g) | |
|---|---|---|---|---|---|---|---|---|
| Test Ex. No. 5 | 72 | 0.99 | 0.41 | Δ | ○ | | 0.011 | ◎ |
| Test Ex. No. 6 | 77 | 0.96 | 0.46 | ○ | ○ | | 0.011 | ◎ |
| Test Ex. No. 7 | 91 | 0.85 | 0.38 | X | X | | 0.021 | X |

Table 2 revealed that a particulate material according to the present example also preferably exhibits a degree of alpha-aluminization falling in a range of from more than 72% to less than 91%, or more preferably exhibits a degree of alpha-aluminization falling in a range of from 77% or more to less than 91%. Moreover, a preferable degree of sphericity was found to be from more than 0.85 to less than 0.99, and a more preferable degree of sphericity was found to be from 0.96 or more to less than 0.99.

What is claimed is:

1. A particulate material consisting of alumina and optionally at least one selected from the group consisting of silica, zirconia, titania, boron nitride, and inevitable impurities,
   wherein the particulate material has a volume average particle diameter of from 70 to 200 μm, degree of sphericity of from 0.89 or more to 0.96 or less, and degree of alfa-aluminization of from 45 to 85%, and
   wherein the particulate material produces a result of 0.017 g or less in a wear test for equipment.

2. A thermal conductive substance comprising:
   the particulate material according to claim 1; and
   a resinous material dispersing the particulate material.

3. The particulate material according to claim 1, wherein the particulate material has the degree of alfa-aluminization of from 50 to 85%.

4. The particulate material according to claim 1, wherein the particulate material has the volume average particle diameter of from 100 to 200 μm.

5. The particulate material according to claim 1, wherein the particulate material has the degree of alfa-aluminization of from 80 to 85%.

6. The particulate material according to claim 1, wherein the particulate material includes alumina in an amount of 99% or more.

* * * * *